Nov. 30, 1954
E. V. BERGSTROM
2,695,815
METHOD OF AND APPARATUS FOR PNEUMATIC TRANSFER
OF GRANULAR CONTACT MATERIAL IN MOVING
BED HYDROCARBON CONVERSION PROCESSES
Filed Feb. 16, 1951
3 Sheets-Sheet 3
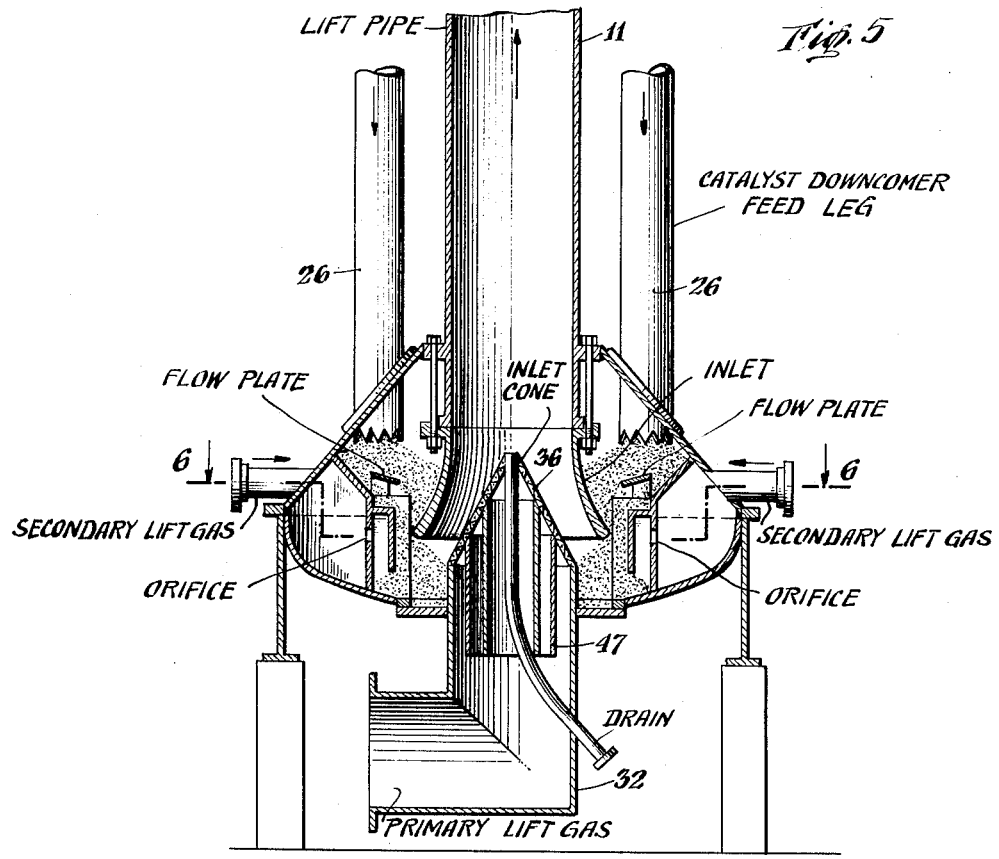
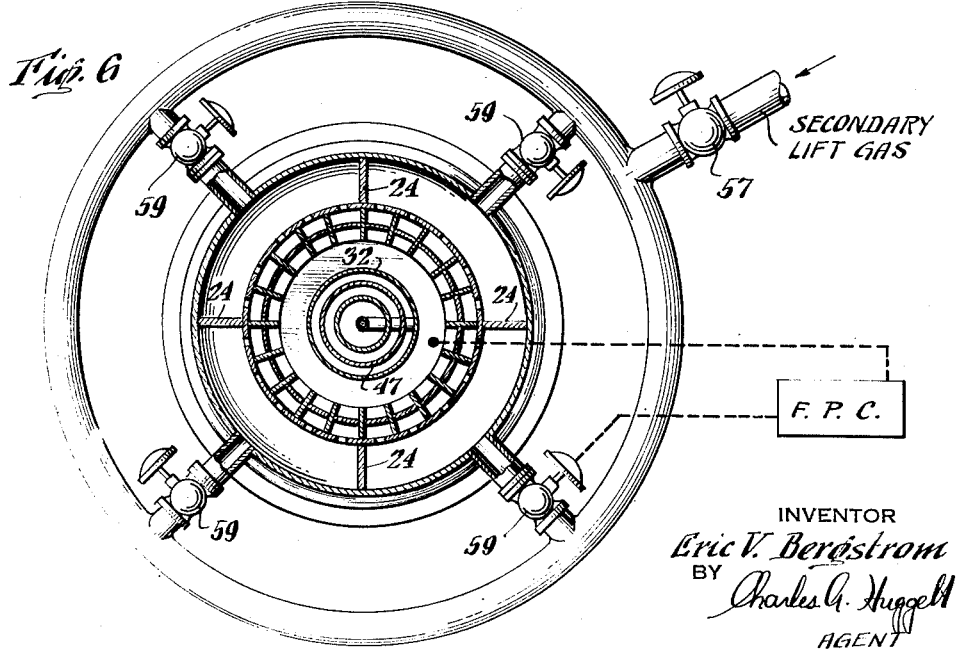
INVENTOR
*Eric V. Bergstrom*
BY
*Charles G. Huggett*
AGENT

United States Patent Office 2,695,815
Patented Nov. 30, 1954

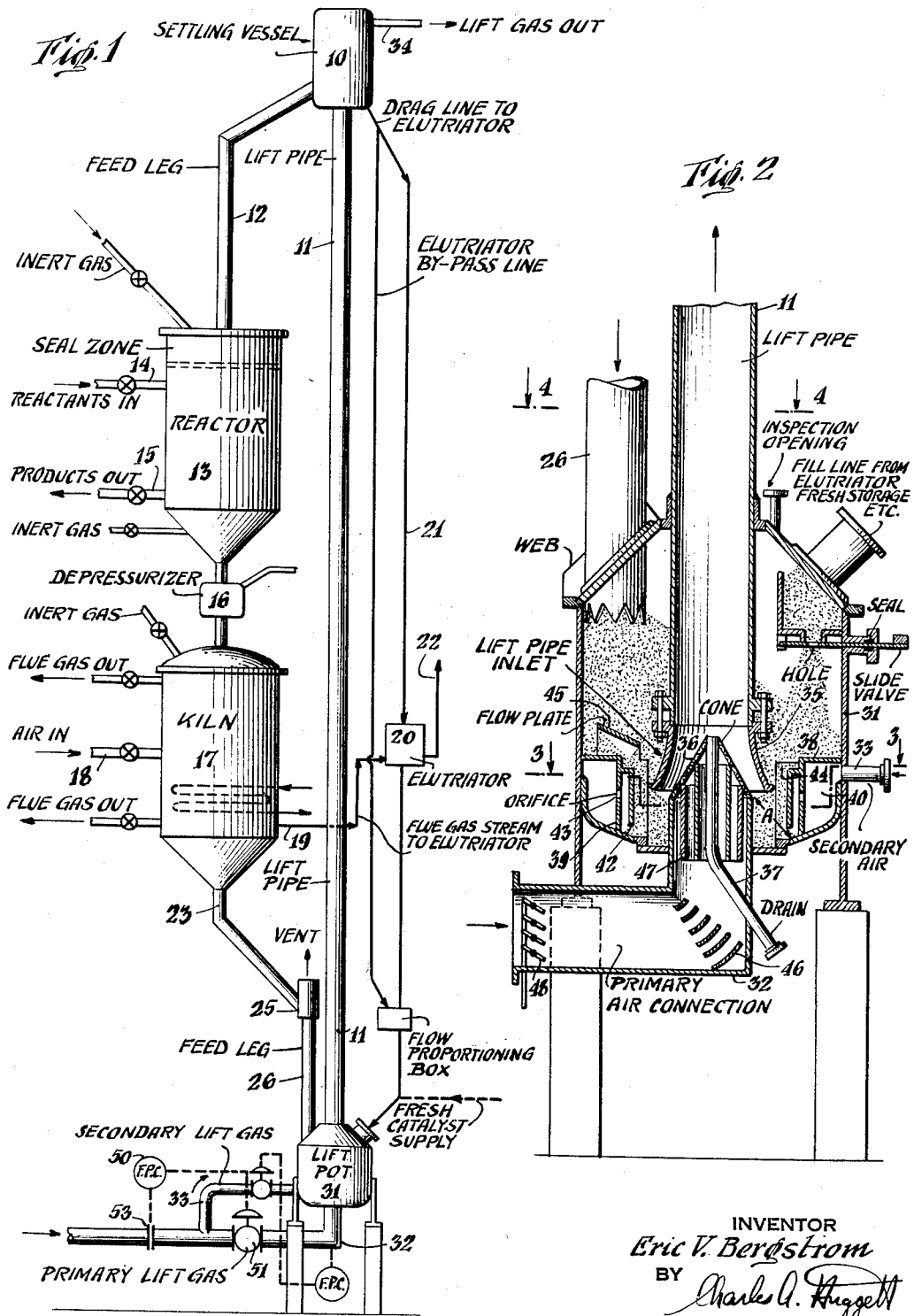

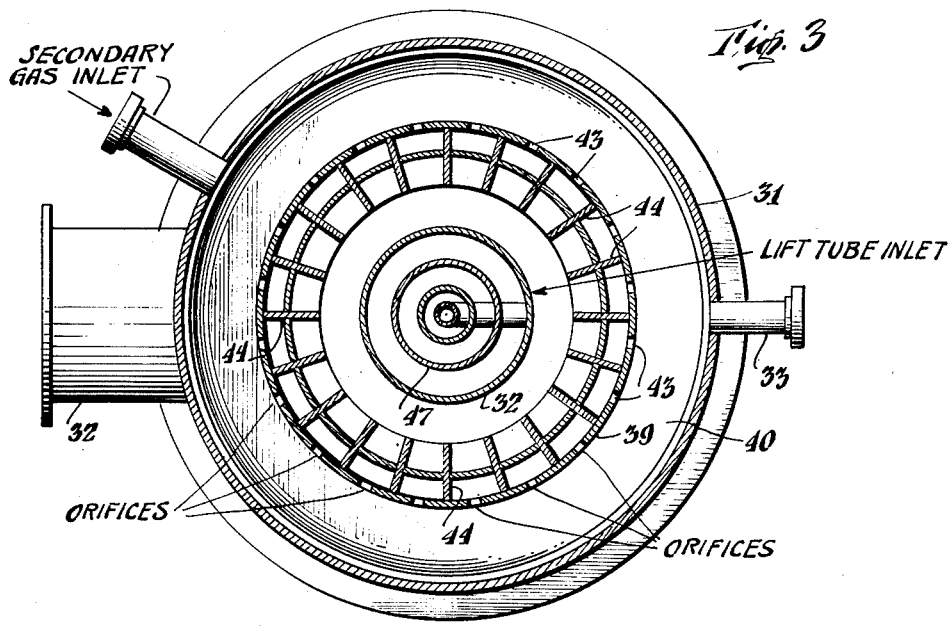
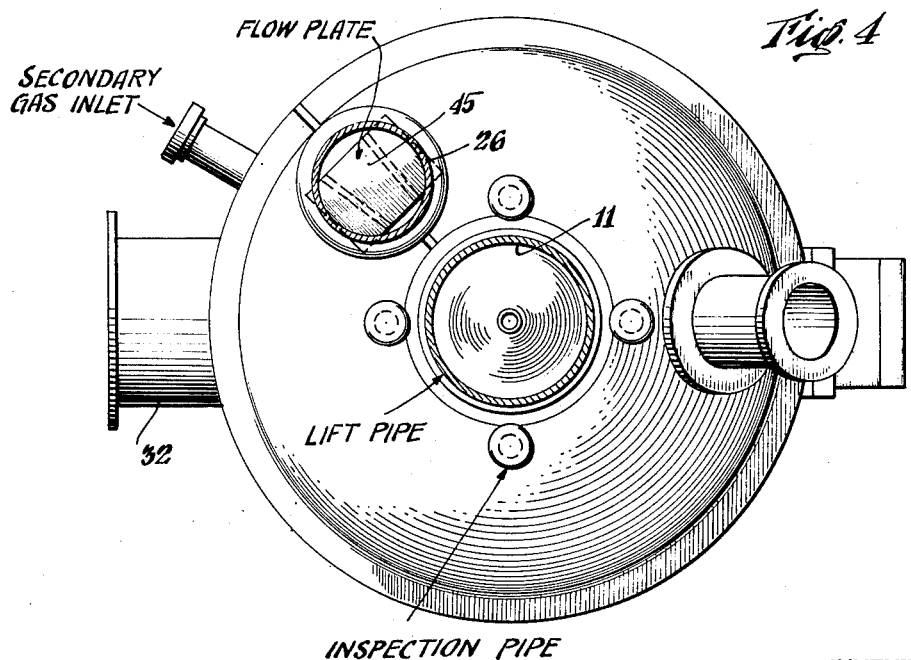

2,695,815

METHOD OF AND APPARATUS FOR PNEUMATIC TRANSFER OF GRANULAR CONTACT MATERIAL IN MOVING BED HYDROCARBON CONVERSION PROCESSES

Eric V. Bergstrom, Short Hills, N. J., assignor to Socony-Vacuum Oil Company, Incorporated, a corporation of New York Application February 16, 1951, Serial No. 211,258

12 Claims. (Cl. 302—17)

This invention relates to the lifting of granular particles in a confined stream of gas and is more particularly directed to improved methods of and apparatus for feeding granular contact material into contact with a lift gas in moving bed hydrocarbon conversion processes.

In the petroleum industry many processes are known in which hydrocarbons, at temperature and pressure suitable for conversion, are contacted with a granular solid material in the form of a gravitating column to produce converted products. In these processes, it is necessary to continuously remove the contact material from the bottom of the column and after treatment in a separate reconditioning zone, lift it upwardly to the top of the column to complete an enclosed, continuous cyclic path. It has been found expedient to lift the catalyst or contact material, in the prior art, by means of bucket-type, continuous, mechanical elevators, primarily because of their low attrition rates. This art saw the advantages of lifting the particles by means of gas lifts, at an early date, but failed to use lifts in place of elevators because all the gas lifts proposed had such high catalyst breakage or attrition rates that their use was not possible.

Examples of various processes in this industry which necessitate the use of granular contact material are alkylation, polymerization, reforming, isomerization, dehydrogenation, cyclization, desulfurization and catalytic cracking. This invention will be described in relation to a catalytic cracking process, being understood, however, to apply broadly to any process or operation in which it is desired to lift a solid granular material upwardly through a substantial vertical distance. For example, it may be applied to conversion processes wherein hydrocarbons, prepared for conversion, are brought into contact with inert refractory particles, and converted products are removed therefrom. Typical of such processes is the production of ethylene from various gas oils at temperatures in the neighborhood of 1500° F.

In the moving bed system of catalytic cracking, the particles in granular form are contacted with suitably prepared hydrocarbons while gravitating downwardly through a reaction zone in the form of a substantially compacted column. The feed stock, usually a gas oil boiling somewhat above the gasoline boiling range, cracks in the presence of the catalyst, forming substantial amounts of hydrocarbons which do boil in the gasoline boiling range. Incident to the cracking operation, a deposit of carbonaceous material or coke is deposited on the surface of the catalyst, impairing its ability to function. The coked or spent catalyst is removed from the bottom of the reaction zone continuously and transferred to the top of a gravitating compact column of particles in a regeneration zone. The catalyst gravitating through the regeneration zone is contacted with combustion supporting gas, such as air, to burn off the coke deposits from the surface of the catalyst. The coke-free or restored catalyst is withdrawn continuously from the bottom of the column in the regeneration or reconditioning zone and transferred to the top of the column in the reaction zone, completing the continuous path. This process involves the use of high temperatures and may involve the use of high pressures. For example, the reaction zone may be maintained at about 800–1100° F., suitable cracking temperature, and the regeneration zone may be maintained at about 900–1300° F., suitable regeneration temperature. The catalyst particles are lifted, therefore, at temperatures of approximately 800–1300° F., or thereabouts. The reaction and regeneration columns can be located in side by side relationship, requiring two lifts connecting the bottom of the columns with the tops of the alternate columns. In another plan, the two zones may be located one above the other, requiring only one lift and a connection between the bottom of the upper zone and the top of the lower zone. One or both zones may be operated at advanced pressure. For example, the reaction zone may be operated at 5–30 p. s. i. (gauge) whereas the reconditioning zone may be operated at about 1 p. s. i. (gauge). In other systems, the vessels may both be operated at 15 p. s. i. (gauge) or the reconditioning zone may be operated at a pressure higher than the reaction zone.

As the catalyst material gravitates through the zones, the gas or vapors contact the catalyst surface by passing through the voids between the particles. It is desirable to maintain the flow of gas through the bed uniform for a variety of reasons. For example, channelling of the gas through the reactor causes uneven deposition of carbon or coke upon the particles passing through the reactor and non-uniform conversion of the reactant charge. The cracking efficiency is materially reduced from that which is obtained when the gas flows uniformly through the bed. Channelling in the regenerator causes the particles passing through the channel to overheat and thereby damage the catalytic activity of these particles. Those particles not receiving their share of combustion supporting gas are not sufficiently regenerated to regain their former cracking activity. Channelling is caused, at least in part, by fine particles concentrating in various regions in the bed, making gas flow through these regions difficult. Fines also increase the pressure drop across the bed, beside introducing other problems, and hence, the production of fines in these systems should be minimized.

It is preferred to use particles of contact material of uniform size and shape in these systems although some irregularity of size of particles is tolerable. For example, they may take the form of pellets, pills, uniform granules and spheres, spheres or beads being preferred. The term "granular" when used in this specification refers broadly to all solid particles of the size range indicated, whether regular or irregular, uniform or non-uniform. The particle size may range from about 3–100 mesh, Tyler screen analysis, and preferably 4–12 mesh Tyler. The catalytic material may be natural or treated clays such as bentonite, montmorillonite or kaolin or may take the nature of certain synthetic associations of silica, alumina, silica and alumina, with or without various additions of other metallic oxides. The particles may also be formed of inert materials, such as, for example, mullite or corhart. When inert materials are used as heat carriers, the particle size may be substantially larger than is shown above. The poured density of these particles ranges from about 20–130 pounds per cu. ft. The poured density is found by pouring a supply of the contact material into a container and measuring the density without tamping or packing.

As indicated, attrition involves the breakage of the particles of contact material, usually encountered when the particles impinge against a metal wall of the enclosed system or against themselves, producing the much smaller particles called fines. Attrition also involves the erosion of the catalyst as the particles slide against each other or against the walls of the apparatus. The attrition is controllable, normally, by withdrawing a side stream of the moving catalyst stream to an elutriator, where the fines are removed. The fines-free particles are returned to the main stream.

In the prior art gas lifts proposed for lifting granular contact material by pneumatic means, the attrition rates were so high that their use was not considered commercially feasible in these moving bed systems. One principal point of high attrition was found to be at the entry to the lift pipe. It has been discovered that the production of fines in gas lifts at this point can be materially reduced or minimized, if the lift gas is maintained between critical limits of velocity, particularly at the lower end of the lift pipe. It has been found that where catalyst feeds onto a bed of contact material around the lower end of the lift pipe from one or more conduits above the bed located adjacent the pipe, and gas is forced through at least a portion of the bed to lift the particles up the pipe, the gas tends to flow non-uniformly through the bed to the lift pipe entrance. This is caused in part by fines classification in the lift tank located at the bottom of the lift pipe, and particularly in those portions of the bed beneath the supply conduits. However, slugging and channelling occur in some instances when fines are not present, and these conditions all cause non-uniform flow around the periphery of the pipe. In order to maintain the catalyst velocities around the periphery of the pipe within the range of values which produce minimum attrition, this invention provides a method and means of supplying catalyst or contact material to the lift pipe entrance at a uniform and carefully controlled rate. This invention provides a new and improved overall lift feed tank design involving a new combination of elements, some of which are considered to be new in themselves. The invention is therefore intended to include not only the new and improved overall lift feed system design but also contains new and improved subcombinations applicable to such systems which will be fully discussed hereinafter and set forth in the claims. One point of improvement relates in part to the system for feeding catalyst into the feed tank. When the contact material feeds onto a bed surrounding the lower end of the pipe from a supply conduit adjacent the pipe, the contact material is drawn primarily from the inner side of the supply conduit entrance and the flow is sluggish from the outer side or the side of the entrance away from the lift pipe. The flow is restricted to the extent that the bed level falls materially and the contact material feeds in slugs onto the top of the bed. This increases the tendency toward non-uniform flow of contact material in the lower end of the lift pipe. This invention discloses a flow plate located below the supply conduit entrance but above the lift pipe entrance located precisely to effect uniform withdrawal of contact material from all points across the supply conduit entrance. The flow plate effects a substantial withdrawal of contact material from the outer portion of the supply conduit entrance downwardly around the outer edge of the flow plate to the lift pipe entrance. It is important with respect to this phase of the invention that the flow plate be properly sized and located relative to the supply conduit entrance and lift pipe entrance to achieve the desired results, as shown in more detail subsequently.

When several streams of contact material are withdrawn from locations substantially equally distributed about the bottom of a contact vessel of large cross-section and delivered to a lift tank about the bottom end of a lift pipe, it is necessary that the streams be controllable to provide uniform withdrawal across the bed in the contact vessel. It is undesirable to control these streams by means of valves or other restrictions because they produce catalyst fines at the location of the restriction. One important phase of this invention involves the provision of separated streams of lift gas which are controllable to separate sectors of the bed surrounding the lower end of the lift pipe at locations laterally displaced from the lower end of the pipe and arranged around the pipe, whereby the withdrawal of contact material from each gravitating stream can be adjusted. This simplified means of effecting uniform downward movement through the gravitating streams without harmful restrictions in the lines is exceedingly important, and particularly so in the larger sized conversion systems. It is desirable to use contacting vessels of large cross-section in these systems in order to obtain contact material handling capacity without the disadvantages of excessive height. Some of these disadvantages are the larger quantity of structural steel required to support the structure and increased height of lift, both material factors in these systems. The above-disclosed features, in addition to others disclosed hereinafter, overcome non-uniform flow of catalyst or contact material into the bottom of the lift.

In the preferred form of gas lift a primary lift gas stream is introduced from a conduit terminated just below, or at least near the bottom of the lift pipe. The end of the conduit terminates above the level assumed by the contact material when no gas is flowing through the lift pipe, so that the primary gas stream enters the lift pipe without passing through any of the contact bed. The secondary gas is introduced into the bed of contact material from locations substantially displaced from the lower end of the lift pipe, so that it passes through a substantial thickness of the bed before entering the pipe. It is desirable that stream-lined gas flow obtain in the lift pipe, and, hence, in this preferred form of lift, stream-lining baffles are installed in the primary gas conduit to provide proper gas introduction for stream-lined flow.

The object of this invention is to provide apparatus for and a method of contacting a gas with a granular contact material to lift the contact material smoothly and efficiently upward through a confined flow path.

A further object of this invention is to provide method and apparatus for feeding contact material to a gas lift at a uniform and carefully controlled even rate.

A further object is to provide a moving bed conversion system and method of improved design.

These and other objects will be made apparent in the following description of the invention which is to be read in conjunction with the attached sketches.

Figure 1 indicates a moving bed conversion system.

Figure 2 indicates a lift pot for a gas lift in a moving bed conversion system in which the lift pot is supplied contact material through a single feed conduit.

Figure 3 indicates a plan view of the lift pot of Figure 2 as seen on plane 3—3 of Figure 2.

Figure 4 indicates a plan view of the lift pot of Figure 2 as seen on plane 4—4 of Figure 2.

Figure 5 indicates a suitable lift pot when multiple feeding conduits are used to supply the lift pot with contact material.

Figure 6 indicates a cross-section of view of Figure 5 as seen on plane 6—6.

These diagrams, highly diagrammatic in form, are used to provide an aid to the understanding of the invention, not being intended to limit the invention thereto.

Referring now to Figure 1, a moving bed system for the conversion of hydrocarbons is shown. The settling vessel 10, located at the top of the lift pipe 11 of the gas lift is made large enough to serve in a dual capacity, both as a separating means and a surge hopper to allow for irregularities in catalyst flow through the moving bed system. The conduit 12 serves as an elongated feed leg to transfer the catalyst from the hopper or vessel 10 into the reaction vessel 13. The reaction vessel may be operated at a pressure which is higher than that of the settling vessel 10, i. e., 5–30 p. s. i. (gauge), and the catalyst will feed into the vessel through the conduit 12 without valves or restrictions in the line, provided the leg is suitably shaped and sufficiently long. Such a feed leg is disclosed and claimed in United States Patent 2,410,309, issued October 29, 1946.

The catalyst is gravitated through the reactor 13 as a compacted column and contacted therein with hydrocarbons, suitably prepared for reaction, introduced through the conduit 14. The reactants may be in liquid, vapor or mixed liquid and vapor form, preheated generally to about 700–800° F., although higher or lower temperatures may, in certain instances, be used, depending, to some extent, upon the type of charging stock. The hydrocarbons are converted in the vessel, upon contacting the catalyst at a temperature of about 800–1100° F. to more desirable materials and the products are removed from the vessel through the conduit 15 to fractionation and processing apparatus, not shown. The spent catalyst is withdrawn continuously from the bottom of the vessel and introduced into a depressurizer 16, usually, where the pressure is reduced practically to atmospheric. This is done, primarily, because it is simpler and more economical to regenerate or restore the material at substantially atmospheric pressure.

The depressurized catalyst is gravitated downwardly as a compact column through the regenerator or kiln 17 wherein it is contacted with combustion supporting gas and the coke deposits are burned. The catalyst may enter the vessel at a temperature in the neighborhood of about 900–1300° F. Temperatures higher than the above heat damage the catalyst, impairing its catalytic activity. Where only a heat carrying medium is required, however, inert refractory particles, such as corhart or mullite, may be used and restored at temperatures well in excess of the above without damage. In order to control the temperature of the kiln, cooling coils may be utilized. Air is introduced into the kiln 17 through the conduit 18 and travels both upwardly and downwardly through the bed, being withdrawn through the conduits 56, 57. A stream of flue gas is taken from the kiln through the conduit 19 to the elutriator 20 located in the catalyst drag line 21. Fines are removed in the elutriator through the conduit 22 with the flue gas.

The catalyst is withdrawn from the bottom of the kiln through the conduit 23. The catalyst is depressurized, if necessary, in the vessel 25, which also provides an outlet for lift gas which passes upwardly through the catalyst column in the conduit 26. It is seen, therefore, that the particles gravitate from the separator or settling vessel 10 downwardly through the contacting zones to the lift tank or lift pot 31 as one continuous, unobstructed compact column.

In a preferred form, the gas lift comprises a suitably elongated substantially vertical pipe, preferably of circular cross-section, with the top of the pipe terminated in a settling vessel 10 and the bottom of the pipe terminated in a lift tank 31. In this preferred form the gravitating granular material is introduced into the top of the lift tank 31 through the conduit 26, the column in conduit 26 being long enough to feed the material into the tank against an advanced pressure therein. The granular material forms a compact bed of particles about the lower end of the lift pipe 11. Lift gas is introduced through the conduits 32, 33 to effect suspension of the particles below the lift pipe 11 and to transfer the particles upwardly through the pipe to the settling vessel 10.

The settling vessel 10 is substantially larger in cross-section than the lift pipe, causing the velocity of the lift gas to decrease after it leaves the pipe. The catalyst is collected on a bed around the top of the lift pipe and the gas is withdrawn from the top of the settling vessel through the conduit 34.

Detail features of this invention are shown on Figures 2 and 3, vertical and horizontal cross-sectional views of the lift tank 31 of Figure 1. The lift pipe is centrally located in the vessel in a preferred form of the apparatus, and is terminated near the bottom of the vessel. A bell-mouthed inlet 35 is shown attached to the lower end of the lift pipe 11, although, in a less preferred form of the apparatus, this can be eliminated. When the bell is eliminated the lower end of the pipe 11 is terminated at about the level of the lower end of the inlet 35. The conduit 26 terminates at a higher level than the lift pipe to provide a bed of contact material about the lower end of the pipe. In the preferred form of apparatus, a gas conduit 32 projects into the lower end of the tank 31 and terminates just below the lower end of the lift pipe or may preferably project into the inlet of the pipe. When no gas is flowing through the lift tank, the contact material forms a bed surface below the open end of the lift pipe at about the angle of repose of the contact material, usually about 25–40 degrees with the horizontal. The gas conduit 32 projects above this surface so that a primary gas stream can be introduced into the lift pipe without passing through any substantial thickness of the contact bed. The screen 36 prevents contact material from dropping into the conduit 32, and the drain pipe 37 provides a withdrawal outlet for contact material accumulated in the lift pipe after a shut down of the apparatus. It has been found that improved operating performance can be obtained by using a properly shaped and located screen 36. The annular stream of secondary gas flowing into the lift pipe is restricted, so as to introduce the catalyst particles at the most effective velocity. The proper position and shape of screen is determined from several interrelated factors, such as the dimensions of the lift, particle size and density, gas flow rates, etc., etc. It is not essential that a screen be used. For example, a perforated baffle, suitably shaped, or a grid may be used.

About the lower end of the lift pipe 11 is located a ring manifold 40. The inside diameter of the manifold is sized to leave an annular space between the lift pipe and the inner wall of the manifold. In a preferred form of the invention the manifold is substantially concentric with the lift pipe and possesses a multiplicity of substantially equal holes in its inner wall uniformly distributed about the wall at a level near the lower end of the pipe. One or more conduits 33 are attached to the manifold for the introduction of secondary gas. Other means of gas introduction are contemplated, however. For example, a horizontal baffle 38 and vertical ring baffle 39 can be used to direct the contact material into an annular space about the bottom of the lift pipe.

Secondary gas can be introduced into the annular space through a plurality of points 43, but as separated streams, i. e., supplied through separate conduits. The flow rate of each stream can be controlled by a valve in each conduit or groups of conduits can be supplied by a common supply header and the flow rate to each header can then control the gas flow to a sector of the space. Such modifications of the apparatus are contemplated as within the scope and spirit of this invention. In addition, it is not essential that the thickness of the space be uniform around the pipe. By controlling the flow of gas to each sector of the annular space separately, an adjustment can be made in the gas pressure supplied to each sector to compensate for the difference in the thickness of the bed in the annular space.

In a preferred form of the invention it is found desirable to use a trough-shaped circular baffle attached to the inner wall of the manifold and terminated at its lower edge near the bottom of the tank. This provides for contact of the secondary gas stream with a relatively large area of contact material near the bottom of the tank. The gas passing under the edge of the baffle then sweeps inwardly and upwardly through the contact material in the annular space to reach the bottom of the lift pipe, effecting a smoother and more efficient entrance of gas and contact material into the lift pipe inlet. It is also found desirable in the more preferred form of the invention to use substantially vertical flat separators distributed about the annular space. These separators are attached to the inner wall of the manifold and extend inwardly in a radial direction to the edge of the lift pipe inlet. They are located one on each side of the openings in the manifold, extending vertically from just above the lower end of the pipe to the bottom of the vessel. They effectively divide the annular space into a multiplicity of equal sectors or compartments, open at the top and inner side and communicating on the outer side with the point of introduction of secondary gas. The compartments divide the gravitating contact material into substantially equal streams, each stream receiving lift gas from one opening in the manifold. Within practical limitations, the greater the number of compartments formed in the annular space by the separators, the more uniformly the contact material feeds about the periphery of the lift pipe. By carefully controlling the flow rate of the secondary streams at a uniform value, the flow rate of the gravitating streams in the compartments is maintained substantially equal, and feeding of the contact material to the lift pipe is smooth, uniform and efficient. In order to maintain uniform flow in the secondary streams, the openings in the manifold are made substantial equal. In addition, they are sized to produce a pressure drop thereacross that is at least greater than the pressure drop across the bed of contact material in the annular space. That is the pressure drop across the distance indicated by A in Figure 2. This minimizes the effect of changes in the pressure drop across the bed in the annular region upon the flow rate of the secondary streams of gas. Therefore, if the pressure drop across the annular space varies somewhat around the pipe, the flow rate of the secondary streams will be only slightly disturbed thereby.

As the contact material is introduced onto the top of the bed surrounding the lift pipe from the conduit 26, it moves laterally to reach the annular space about the lift pipe. The surface of the bed from the supply conduit entrance slopes downwardly at the angle of repose of the catalyst, generally about 25–40 degrees. It has been found that under these conditions there is a tendency for the contact material to feed from the side of the supply conduit entrance nearest the lift pipe and not from the side away from the lift pipe. This restricts the flow from the supply conduit to the extent that it cannot meet the demands of the lift pipe and the level of the bed in the lift tank drops until a slug of contact material is discharged from the supply conduit. This causes disturbed and irregular feeding around the lift pipe entrance. It has been found that this trouble can be overcome by a suitably shaped and appropriately placed flat flow plate 45. The plate is located approximately below the supply conduit entrance, tipped downwardly toward the lift pipe at about the angle of repose of the contact material. An angle of about 30 degrees is generally satisfactory. The inner edge of the plate is terminated about over the midpoint between the trough-shaped baffle and the edge of the lift pipe; in other words, the center of the annular space in the region between the lift pipe and the supply conduit. The upper outer edge of the plate is terminated so that lines drawn upwardly from this edge at about 65–75 degrees with the horizontal, the angle of internal flow for the contact material, include within the angle at least the outer portion of the supply conduit and preferably at least half the entrance area.

The location of the flow plate may be described more precisely with respect to an imaginary plane passed through the axes of the supply conduit and the lift pipe if they are both vertical, and, if not, by a vertical plane which passes through the center of the lift pipe entrance and supply conduit entrance. This plane intersects the flow plate forming a trace located at an angle of about 25–40 degrees with the horizontal, and preferably about 30 degrees. The trace tips downward toward the lift pipe and the lower end is terminated so that an imaginary vertical line passing through the end passes between the means defining an annular space around the lower end of the lift pipe and the end of the pipe. The horizontal distance from this line to the means defining the annular space should not be greater than the shortest distance between the means defining the annular space and the trace, and is preferably less. In the preferred form, the imaginary line passes through the midpoint of the annular space. The upper end of the trace should be terminated between imaginary lines drawn vertically downward from the center of the supply conduit entrance and the side of the entrance farthest away from the lift pipe, and preferably is terminated at a midpoint between these lines. In the preferred form of the invention, the plate is disposed so that a second imaginary plane which coincides with the under surface of the plate is perpendicular to the first imaginary plane.

By locating the plate as described, contact material is drawn uniformly downward across the entrance of the supply conduit, eliminating the undesirable irregular feeding previously described. This is explained by the fact that when contact material is drawn from beneath a bed of the material, it draws primarily from a region defined by the angle of internal flow of the contact material. For example, an inverted cone whose side walls are located at an angle of about 65–75 degrees with the horizontal. Contact material flow from regions outside of this cone is sluggish or dead. When a free surface is provided for the contact material, however, the material flows laterally to form a surface angle of about 25–40 degrees, the angle of repose of the contact material. By locating the flow plate at the angle of repose of the contact material a free surface is provided for the contact material under the plate, and hence, the contact material flows laterally under the plate and downward into the annular space around the bottom of the lift pipe in the region shielded by the flow plate. The plate must be located far enough above the secondary gas manifold and trough-shaped ring baffle, the means defining the annular space, to prevent throttling of the stream passing under the plate. Since the upper end of the plate is located directly below the outer half of the supply conduit entrance, contact material will be drawn downward from the outer portion of the conduit entrance and passed under the plate. This effects uniform withdrawal of contact material from all portions of the supply conduit entrance, thereby preventing the non-uniform feeding from the supply conduit.

It is understood that other shapes can be used besides a flat flow plate, provided the principles of operation of such a baffle are understood and applied to effect flow from the outer portion of the supply conduit entrance under the baffle to the annular space. The flat flow plate is preferred because of its simplicity. However, other shapes are contemplated as within the scope and spirit of the invention. Where several supply conduits are used to feed contact material to the lift tank, a flow plate is located beneath each conduit. Figure 4 shows the location of the flow plate beneath the supply conduit entrance.

Referring to Figures 5 and 6, a lift tank is shown adapted to receive contact material from four supply conduits. The conduits are distributed uniformly about the top of the tank, each serving a quadrant of the bed about the centrally located lift pipe. As indicated a flow plate is located below each conduit to provide smooth withdrawal from the supply conduits. The manifold is separated into four sections by the partitions 24. The partitions are located substantially midway between the supply conduits on a horizontal plane. Each quadrant of the manifold is equipped with a separate secondary gas supply conduit and a control valve 59. By regulating the separate valves, therefore, the flow of contact material from each supply conduit can be adjusted. By this procedure, the flow through the four supply conduits can be maintained uniform. Since these conduits withdraw contact material from locations equally distributed about the bottom of one of the contacting vessels, this, in effect, provides uniform downward movement of all particles across the bed in the vessel. This feature of the invention is exceedingly important, particularly in the larger size conversion systems, which utilize multiple draw-off streams. The overall flow rate of the contact material can be controlled by adjustment of the valve 57 in the main line, as shown on Figure 6.

It has been found that the flow rate of the contact material through the lift pipe is proportional to the pressure of the gas at the lower end of the lift pipe. This pressure can be used to indicate contact material flow therefore, or may be used to operate a pressure controller which then controls the valve in the secondary gas line. After setting the controller at the desired flow rate, the lift is automatically controlled to deliver a constant flow of contact material. Where multiple conduits are used to supply contact material to the lift tank, this scheme may be used to control the flow of gas to each sector, as shown on Figure 6, thereby insuring both uniform downward flow through the supply conduits and constant flow of contact material up the lift pipe.

In operation, the contact material is supplied continuously, therefore, to the region about the lower end of the lift passage to form a bed which surrounds the lower end of the passage and is in communication with the interior of the passage at the lower end. Separate streams of secondary gas are introduced at a plurality of points located below the bed surface around the lift passage and laterally spaced away from the passage such that an annular portion of the bed is located between the points of gas introduction and the lower end of the lift passage. The points of secondary gas introduction are so distributed about the passage that a separate sector of the annular bed is supplied with secondary gas by each of the secondary streams. A primary stream of gas is supplied directly to the lower end of the passage from a level near the bed surface under the passage so that the gas does not flow through any substantial thickness of the bed. The proportion of primary gas flow to the total lift gas flow can be varied over a wide range. As an example, however, 75–95 per cent of the total gas flow is suitable. The separate streams of secondary gas pass through the intervening contact material between the location of gas introduction and the lower end of the lift passage at a rate sufficient to push the solid material into the stream of primary gas, effecting a suspension and lifting of the contact material to the separating zone located thereabove.

In general, the contact material velocity and gas velocity in the lift passage for smooth lifting will depend, to some extent, upon the physical dimensions of the lift. Broadly, the wide range of the catalyst equilibrium velocity is about 5–300 ft. per sec., whereas a practical range for commercial use is about 5–75 ft. per sec. The catalyst equilibrium velocity is the difference between the gas actual linear velocity, at any given location in the lift pipe, and the catalyst terminal velocity. The catalyst terminal velocity depends on the catalyst density, form and shape, and upon the particular lift gas or gases and also the temperature and pressure conditions involved. The catalyst terminal velocity for any given condition can be calculated from equational relationships or estimated from data which are available in the public literature. It may also be determined by routine experimental methods, well known in the art. The values of catalyst equilibrium velocities referred to hereinabove are those values at the lower end of the lift pipe interior. For a small lift about 40 ft. tall and 3 inches inside diameter, the catalyst equilibrium velocity may range from about 5–50 ft./sec., whereas for a large litf about 200 ft. tall and 17 inches inside diameter, the catalyst equilibrium velocity may range from about 35–75 ft./sec. In general, the gas velocity will range from about 30–150 ft./sec., being about 30–120 ft./sec. for the small or short lift and 70–150 ft./sec. for the large or long lift, previously described.

Example I

A lift tank was designed for commercial application of the invention in a moving bed catalytic cracking system of about 10,000–15,000 bbls. of crude per stream day capacity and a circulation rate of about 365 tons of catalyst per hour. The catalyst was a synthetic chrome bead type of about ⅛ in. diameter. The shape of the vessel is generally similar to that shown in Figures 5 and 6, having a central lift pipe and four downcomers or supply conduits equally distributed about the pipe attached to the top of the vessel. The pertinent dimensions were:

| | |
|---|---|
| Largest diameter | 9 ft. |
| Top diameter | 3⅓ ft. |
| Bottom diameter | 4⅔ ft. |
| Distance of primary gas inlet pipe above bottom of tank (not including inlet cone) | ½ ft. |
| Diameter of primary gas inlet pipe | 2⅔ ft. |
| Distance of lift pipe inlet above bottom of tank | 1 ft. |
| Diameter of lift pipe inlet bell at bottom | 4 ft. 1½ in. |
| Inside diameter of ring manifold | 5½ ft. |
| Shortest distance between inlet cone and lift pipe inlet | About 2 in. |
| Inside diameter of trough-shaped ring baffle | 4 ft. 9½ in. |
| 4 supply conduits, uniformly spaced on 5 ft. diameter circle, each having an internal diameter of | 12¼ in. |
| Distance of lower ends of supply conduits above bottom of tank | 3 ft. |
| 4 flow plates, one beneath each supply conduit, the center of each plate being directly in line with the longitudinal axis of each supply conduit. | |
| Length of flow plate | ⅔ ft. |
| Angle of flow plate | 30 degrees. |
| Distance of outer edge of flow plate above top of trough-shaped ring baffle | 7 in. |
| Distance of top of trough-shaped ring baffle above bottom of lift pipe entrance | 8 in. |
| Inside diameter of secondary gas supply conduits (4 in number) | 6 in. |
| Height of flat separators | 18 in. |
| Width of flat separators | 8½ in. |
| Number of flat separators | 20. |

Example II

A lift tank was designed for commercial application of the invention in a moving bed catalytic cracking system of about 3000–6000 bbls. of crude per stream day capacity and a circulation rate of about 100 tons of catalyst per hour. The catalyst was a synthetic silica-aluminia bead of about ⅛ in. diameter. The shape of the vessel is generally similar to that shown in Figures 2 and 3, having a central lift pipe and a single supply conduit. The pertinent dimensions were:

| | |
|---|---|
| Diameter of vessel | 4 ft. 6 in. |
| Distance of centerline of supply conduit from centerline of lift pipe | 1 ft. 7½ in. |
| Distance from lower end of lift pipe entrance to bottom of tank | 8½ in. |
| Distance from lower end of supply conduit to bottom of tank | 41½ in. |
| Inside diameter of lift pipe | 14¾ in. |
| Outside diameter of lift pipe inlet at the bottom | 2 ft. 2¼ in. |
| Inside diameter of supply conduit | 12¼ in. |
| Inside diameter of manifold | 2 ft. 11¼ in. |
| Inside diameter of trough-shaped ring baffle | 2 ft. 6¼ in. |
| Distance from bottom of vessel to top of ring baffle | 14 in. |
| Height of ring baffle | 12 in. |
| Distance of manifold openings below top of ring baffle | 4 in. |
| Height of inner wall of ring manifold | 1 ft. 3 in. |
| Flow plate support below the supply conduit: | |
| Length | 12 in. |
| Width (shown on Figure 2) | 10 in. |
| Thickness | ½ in. |
| Angle with horizontal | 30 degrees. |
| The inner edge of the plate is centered over the annulus therebelow. The outer edge is 4 in. inward from the wall of the vessel. | |
| Number of separators | 20. |

In the preferred form of gas lift, it is desirable to provide a streamlined gas flow in the lift pipe. It has been discovered that a multiplicity of substantially concentric cylindrical baffles 47 mounted centrally in the primary gas conduit 32 are effective for this purpose. This embodiment is shown on Figures 2 and 5 of the drawings. When the conduit bends prior to its introduction into the tank, as shown on Figures 2 and 5, additional baffling means are installed to aid in effecting streamlined flow of the gas at the outlet of the conduit. For example, the vanes 46 are installed at the bend to reroute the gas. Also, the adjustable Venetian blinds 48 are installed in the conduit a substantial distance away from the bend. The blinds 48 are adjusted by movement of the rod 49 to provide optimum performance in the lift.

The examples, given hereinabove, were supplied to illustrate the invention, and not to limit its scope. It is intended that the scope of this invention be considered broadly to cover all changes and modification of the examples of the invention herein chosen for purposes of disclosure, which do not constitute departures from the spirit of the invention.

I claim:

1. In a lift tank, as described, a multiplicity of means for introducing equal quantities of gas at a plurality of locations spaced uniformly in a ring around the lift pipe near the level of the bottom of the pipe, said means being spaced substantially equal distances from the lower end of the pipe, a multiplicity of separating means located in the annular space between said gas introducing means and the lower end of said lift pipe, said means adapted to provide separate sectors open at their top and inner surfaces and connecting on their outer surfaces with the gas introducing means.

2. Apparatus for mixing lift gas and contact material which is gravitated downwardly about the bottom end of a lift pipe comprising a ring manifold surrounding the lower end of said lift pipe, so as to leave an annular space between the manifold and lift pipe, said manifold possessing a multiplicity of holes in its inner wall, distributed about the ring, a plurality of vertically disposed separators distributed about the annular space, so as to divide the gravitating contact material in said annular space into a multiplicity of substantially separated streams, said separators arranged on each side of the manifold openings, to prevent circumferential transfer of the gas through the annular space.

3. Apparatus for mixing lift gas and contact material at the bottom of a lift pipe comprising a ring manifold surrounding the lower end of said lift pipe and substantially concentric therewith, so as to leave an annular space between the manifold and lift pipe, said manifold possessing a multiplicity of holes in its inner wall, substantially uniformly distributed about the ring, a plurality of vertically disposed flat separators, uniformly distributed about the annular space, so as to divide the annular space into a multiplicity of substantially equal sectors, said separators arranged one on each side of the manifold openings, so as to prevent circumferential transfer of the gas through the annular space.

4. Apparatus for mixing lift gas and contact material gravitated about the bottom of a lift pipe comprising a ring manifold surrounding the lower end of said lift pipe and substantially concentric therewith, so as to leave an annular space between the manifold and lift pipe, said manifold possessing a multiplicity of holes in its inner wall, substantially uniformly distributed about the ring, a plurality of vertically disposed flat separators, uniformly distributed about the annular space, so as to divide the contact material gravitating in said annular space into a multiplicity of substantially equal separated streams, said separators arranged one on each side of the manifold openings, so as to prevent circumferential transfer of the gas through the annular space, and a trough-shaped deflecting baffle of circular shape, attached to said manifold over said holes, so as to deflect the gas downwardly to a level substantially below the lower end of the lift pipe before it contacts the contact material in said annular space.

5. An improved lift tank for a gas lift which comprises a vessel into which the lift pipe downwardly projects, at least one conduit attached to the top of the vessel, for introducing contact material into the upper section of the vessel, so as to form a bed of the material about the lower end of the pipe, a gas conduit projected into the vessel and terminated just below the lift pipe, a ring manifold surrounding the lower end of said lift pipe and substantially concentric therewith, so as to leave an annular space between the manifold and the lift pipe, said manifold possessing a multiplicity of holes in its inner wall, substantially uniformly distributed about the ring, a plurality of vertically disposed flat separators, uniformly distributed about the annular space, so as to divide the contact material gravitating in said annular space into a multiplicity of substantially equal separated streams, said separators arranged on each side of the manifold openings, so as to prevent circumferential transfer of the gas through the annular space, and a trough-shaped deflecting baffle of circular shape, attached to said manifold over said holes, so as to deflect the gas downwardly to a level substantially below the lower end of the lift pipe.

6. In a lift tank as described in claim 5 a flow plate located below each supply conduit in the top of the vessel, disposed at an angle of about 25–45 degrees with the horizontal, the lower edge terminating toward the lift pipe at a horizontal location intermediate between the trough-shaped baffle and the lower end of the lift pipe and at a vertical location above the annular space between these members, so as to divide the downward flow of contact material about the plate into upper and lower streams, the upper end of the plate terminating away from the pipe toward its related supply conduit, so that imaginary lines upwardly projected therefrom at an angle of about 65–75 degrees with the horizontal form a spatial region which intersects at least the outer portion of the lower end of the supply conduit.

7. In a lift tank having a lift pipe projected downwardly into the tank and a supply conduit adjacent the lift pipe projected downwardly into the tank, the supply conduit terminated at a higher level than the lift pipe, and means defining an annular space around the bottom of the lift pipe, the improvement which comprises means for withdrawing contact material from the supply conduit into the tank at a uniform rate across the conduit entrance, said means being a flow plate located below the supply conduit entrance and above the lift pipe entrance, so that an imaginary vertical plane passed through the centers of the lift pipe entrance and supply conduit entrance intersects the flow plate intermediate its ends forming a line trace in the plane, said trace forming an angle of about 25–40 degrees with the horizontal, pitched upwardly away from the lift pipe, an imaginary line drawn vertically downward from the lower end of the trace passes between the means defining an annular space and the lower end of the lift pipe, the horizontal distance between said vertical line and the means defining the annular space being no greater than the shortest distance between the trace and the means defining the annular space, the upper end of said trace falling between imaginary vertical lines directed downward from the center of the supply conduit entrance and the side of the entrance farthest away from the lift pipe, and the flow plate disposed so that a second imaginary plane which coincides with the under surface of the flow plate is substantially perpendicular to the first imaginary plane.

8. In a lift tank having a lift pipe projected downward into the tank and a supply conduit adjacent the lift pipe projected downward into the tank, the supply conduit terminated at a higher level than the lift pipe, and means defining an annular space around the bottom of the lift pipe, the improvement which comprises means for withdrawing contact material into the tank at a uniform rate across the conduit entrance, said means being a flow plate located below the supply conduit entrance and above the lift pipe entrance, so that an imaginary vertical plane passed through the centers of the lift pipe entrance and the supply conduit entrance intersects the flow plate intermediate its ends forming a line trace in the plane, said trace forming an angle of about 25–40 degrees with the horizontal, pitched upwardly away from the lift pipe, an imaginary line drawn vertically downward from the lower end of the trace passes through substantially the midpoint between the means defining the annular space and the lower end of the lift pipe, the horizontal distance from said vertical line and the means defining the annular space being no greater than the shortest distance between the trace and the means defining the annular space, the upper end of said trace falling between imaginary vertical lines directed downward from the center of the supply conduit entrance and the side of the entrance farthest away from the lift pipe, and the flow plate disposed so that a second imaginary plane which coincides with the under surface of the flow plate is substantially perpendicular to the first imaginary plane.

9. In a lift tank having a lift pipe projected vertically downward into the tank and a supply conduit adjacent the lift pipe projected vertically downward into the tank, the supply conduit terminated at a higher level than the lift pipe, and means defining an annular space around the bottom of the lift pipe, the improvement which comprises means for withdrawing contact material into the tank at a uniform rate across the conduit entrance, said means being a flow plate located below the supply conduit entrance and above the lift pipe entrance, so that an imaginary plane passed through the axes of the lift pipe and supply conduit intersects the flow plate intermediate its ends forming a line trace in the plane, said trace forming an angle of about 30 degrees with the horizontal, pitched upwardly away from the lift pipe, an imaginary line drawn vertically downward from the lower end of the trace passes through the midpoint of the annular space, the vertical distance from the trace to the nearest point of contact of the means defining the annular space is greater than half the thickness of the annular space, the upper end of the trace contacts an imaginary vertical line drawn downward from the midpoint betwen the center of the supply conduit and the side of the conduit away from the lift pipe, and the flow plate is disposed so that a second imaginary plane which coincides with the under surface of the plate is perpendicular to the first imaginary plane.

10. In a hydrocarbon conversion process in which a granular contact material is passed downwardly as a substantially compact column through reaction and reconditioning zones and the solids are conveyed upwardly in a stream of lift gas through a vertically extending, open-ended passage, from a location beneath one of said contacting zones to a location above the other of said zones, which comprises: gravitating contact material downwardly from one of said zones to a feed zone located about the bottom of said passage, maintaining a compact mass of contact material in said feed zone, gravitating the contact material in said feed zone, downwardly about the lower end of said open-ended passage, introducing secondary lift gas into a confined ring-shaped plenum zone located about the lower end of said passage, said zone being spaced away from said passage to provide a gravitating annular column of contact material between said passage and said zone, discharging the secondary gas from said plenum zone as a multiplicity of separate streams of gas from locations uniformly distributed about the lower end of the lift passage, so as to pass inwardly from said plenum zone through the intervening column of contact material and drive contact material into the lower end of the lift passage, effecting a uniform pressure drop of the streams of lift gas discharged from the plenum zone which is substantially greater than the pressure drop of each stream of lift gas across the annular column of contact material, whereby the flow rate of the streams of secondary lift gas is maintained substantially equal, and introducing a primary lift gas into the lower end of said lift passage, so as to enter the passage without passing through any substantial thickness of the mass of contact material in said feed zone, whereby the contact material is conveyed in a stream of lift gas upwardly through the passage to a location above the other contacting zone.

11. In a hydrocarbon conversion process in which a granular contact material is passed downwardly as a substantially compact column through reaction and reconditioning zones and the solids are conveyed upwardly in a stream of lift gas through a vertically extending, open-ended passage, from a location beneath one of said contacting zones to a location above the other of said zones, which comprises: gravitating contact material downwardly from one of said zones to a feed zone located about the bottom of said passage, maintaining a compact mass of contact material in said feed zone, gravitating the contact material in said feed zone downwardly about the lower end of said open-ended passage as a plurality of substantially compacted columns of contact material arranged uniformly about the passage, each column being separated from adjacent columns by vertical partitions, introducing secondary lift gas into a confined ring-shaped plenum zone located about the lower end of said passage, said zone being spaced away from said passage to provide an annular region through which the laterally separated columns of contact material are gravitated, discharging the secondary gas from said plenum zone as a multiplicity of separate streams of gas from locations uniformly distributed about the plenum zone, so that each column of contact material gravitating about the lower end of the lift passage receives a separate supply of gas which is sufficient to move the contact material into the lower end of the passage, effecting a uniform reduction of the gas pressure of the streams of secondary gas as they are discharged from the plenum zone which is substantially greater than the pressure drop of any of the streams across the column of contact material between the plenum zone and the lower end of the lift passage, so as to maintain the flow rate of the streams of gas discharged from the plenum zone substantially equal, and introducing a primary lift gas into the lower end of said lift passage, so as to enter said passage without passing through any substantial thickness of the mass of contact material in the feed zone.

12. In a hydrocarbon conversion process in which a granular contact material is passed downwardly as a substantially compact column through reaction and reconditioning zones of enlarged horizontal cross-section and the solids are conveyed upwardly in a stream of lift gas through a vertically extending, open-ended passage, from a location beneath one of said contacting zones to a location above the other of said zones, which comprises: gravitating contact material downwardly from a multiplicity of points distributed uniformly about the bottom of one of said zones as substantially compact columns and discharging the columns onto the top of a mass of the contact material in a feed zone located about the bottom of said passage at points uniformly distributed about the passage, gravitating the contact material in said feed zone downwardly about the lower end of said open-ended passage as a plurality of substantially compacted columns of contact material arranged uniformly about the passage, each column being separated from adjacent columns by vertical partitions, introducing secondary lift gas into separated confined sectors of a ring-shaped plenum zone located about the lower end of said passage, said zone being spaced away from said passage to provide an annular region through which the laterally separated columns of contact material are gravitated, discharging the secondary gas from the separated sectors of said plenum zone through orifices uniformly distributed about the plenum zone, so that each column of contact material gravitating about the lower end of the lift passage receives a separate supply of gas which is sufficient to move the contact material into the lower end of the lift passage, effecting a substantially equal pressure drop of the gas passing through the orifices in the plenum zone which is substantially greater than the pressure drop of any of the gas streams between the plenum zone and the lower end of the lift passage, so as to maintain the flow rate of each gas stream substantially equal in spite of minor irregularity in the thickness of the column of contact material through which the gas streams flow, adjusting the flow rate of the secondary gas supplied to each confined sector of the plenum zone in response to variation of the flow of contact material in the column of contact material located above the confined sector, whereby uniform downward movement of the contact material in the contacting zone is maintained at all points across the bed, and introducing a primary lift gas into the lower end of the lift passage so as to enter the passage without passing through any substantial thickness of the mass of solid material in the feed zone.

References Cited in the file of this patent

UNITED STATES PATENTS

| Number | Name | Date |
|---|---|---|
| 1,339,977 | Pruden | May 11, 1920 |
| 1,364,532 | Von Porat | Jan. 4, 1921 |
| 1,390,974 | Von Porat | Sept. 13, 1921 |
| 1,827,727 | Blizard | Oct. 20, 1931 |
| 1,971,853 | Ihlefeldt | Aug. 28, 1934 |
| 2,487,961 | Angell | Nov. 15, 1949 |
| 2,561,409 | Ardern | July 24, 1951 |
| 2,616,521 | Berg | Nov. 4, 1952 |

FOREIGN PATENTS

| Number | Country | Date |
|---|---|---|
| 714,298 | Germany | Oct. 30, 1941 |